(12) United States Patent
Yang et al.

(10) Patent No.: US 12,716,452 B2
(45) Date of Patent: Aug. 25, 2026

(54) ARC-SHAPED SEGMENT FOR ASSEMBLING A SEGMENTED CAGE, CAGE AND BEARING

(71) Applicant: Aktiebolaget SKF, Gothenburg (SE)

(72) Inventors: Jianying Yang, Kunshan (CN); Xue Ying, Kunshan City (CN); Meng Zhang, Shanghai (CN); He Zhu, Shanghai (CN)

(73) Assignee: Aktiebolaget SKF, Goteboerg (SE)

( * ) Notice: Subject to any disclaimer, the term of this patent is extended or adjusted under 35 U.S.C. 154(b) by 129 days.

(21) Appl. No.: 18/533,777

(22) Filed: Dec. 8, 2023

(65) Prior Publication Data

US 2024/0200601 A1 Jun. 20, 2024

(30) Foreign Application Priority Data

Dec. 15, 2022 (CN) ......................... 202211626046.5

(51) Int. Cl.
*F16C 33/38* (2006.01)
*F16C 33/66* (2006.01)

(52) U.S. Cl.
CPC ...... *F16C 33/3887* (2013.01); *F16C 33/3812* (2013.01); *F16C 33/6614* (2013.01); *F16C 33/6629* (2013.01); *F16C 33/6681* (2013.01); *F16C 33/3818* (2013.01)

(58) Field of Classification Search
CPC .............. F16C 33/3812; F16C 33/3813; F16C 33/3887; F16C 33/4664; F16C 33/4767; F16C 33/502; F16C 33/506; F16C 33/6614; F16C 33/6629; F16C 33/6651; F16C 33/6681
See application file for complete search history.

(56) References Cited

U.S. PATENT DOCUMENTS

| | | | | |
|---|---|---|---|---|
| 4,844,628 A * | 7/1989 | Knappe | F16C 33/3812 384/510 |
| 5,749,661 A * | 5/1998 | Moller | F16C 19/166 384/531 |
| 6,206,575 B1 * | 3/2001 | Matsushita | F16C 33/3812 384/573 |
| 9,518,606 B2 * | 12/2016 | Shi | G11B 33/1473 |

(Continued)

FOREIGN PATENT DOCUMENTS

| | | |
|---|---|---|
| DE | 3811958 A * | 10/1989 |
| FR | 2876169 A1 | 4/2006 |

(Continued)

OTHER PUBLICATIONS

Machine Translation of DE3811958A1 (Year: 1989).*

(Continued)

*Primary Examiner* — Alan B Waits
(74) *Attorney, Agent, or Firm* — Stinson LLP

(57) ABSTRACT

The present disclosure relates to a cage for a bearing. The cage includes a pocket. A lubrication structure is disposed on the pocket. The lubrication structure includes a lubricant storage groove and/or a lubricant guiding groove. This lubrication structure is especially suitable for the lubrication of large-size cages and large-size bearings. The present disclosure also provides a bearing, which comprises the cage described herein.

20 Claims, 5 Drawing Sheets

(56) References Cited

U.S. PATENT DOCUMENTS

| | | | | |
|---|---|---|---|---|
| 2002/0041719 | A1* | 4/2002 | Kawakami | F16C 33/6614 384/531 |
| 2006/0008192 | A1* | 1/2006 | Sekimoto | F16C 33/3856 384/523 |
| 2016/0265593 | A1* | 9/2016 | Shi | F16C 33/6681 |
| 2017/0314619 | A1* | 11/2017 | Tsuji | F16C 33/3887 |
| 2018/0172075 | A1* | 6/2018 | Sugita | F16C 33/44 |
| 2019/0249717 | A1* | 8/2019 | Sugita | F16C 33/6614 |

FOREIGN PATENT DOCUMENTS

| | | | | | |
|---|---|---|---|---|---|
| JP | H10227314 | A | * | 8/1998 | F16C 33/3887 |
| JP | 3952107 | B2 | | 8/2007 | |
| JP | 2008133894 | A | * | 6/2008 | F16C 33/3887 |
| JP | 2009299820 | A | | 12/2009 | |
| JP | 2011007247 | A | | 1/2011 | |
| JP | 2013177944 | A | | 9/2013 | |
| WO | WO-8704502 | A1 | * | 7/1987 | F16C 33/7893 |
| WO | WO-2010066293 | A1 | * | 6/2010 | F16C 33/3862 |
| WO | 2011018489 | A1 | | 2/2011 | |

OTHER PUBLICATIONS

Machine Translation of JP 2008133894A (Year: 2008).*
Machine Translation of WO-8704502-A1 (Year: 1987).*
Machine Translation of DE-3811958-A (Year: 1989).*
Machine Translation of JP-H10227314-A (Year: 1998).*

* cited by examiner

ARC-SHAPED SEGMENT FOR ASSEMBLING A SEGMENTED CAGE, CAGE AND BEARING

CROSS-REFERENCE TO RELATED APPLICATION

This application claims priority to Chinese Application No. 202211626046.5, filed Dec. 15, 2022, the entirety of which is hereby incorporated by reference.

FIELD

The present disclosure provides an arc-shaped segment for assembling a segmented cage, a cage and a bearing.

BACKGROUND

In the field of large equipment, such as CT machine, it often involves using a rotating shaft with a very large diameter, and size of a bearing used on the shaft is also very large. Accordingly, a cage for rolling elements used for this large-diameter bearing shall also have a large diameter. For example, diameter of the pitch circle of the cage for the bearing used in a CT machine may be 1-1.5 meters, wherein the pitch circle is a circle formed by all the pocket centers (such as the geometric centers or centroids of the pockets) of the cage.

A traditional manufacturing process of the cage involves integral injection molding of the cage. However, due to the large size of the cage and the need for large manufacture equipment, it is difficult to carry out the manufacture, and it is hard to guarantee the dimensional accuracy. Moreover, a cage molded by integral injection molding can be only used on a bearing with a certain diameter, and when bearings with different diameters need to be adopted, new cages need to be manufactured and assembled. Moreover, such cage molded by integral injection molding is difficult to be assembled because of its large size.

In addition, the cage made by integral injection molding has a simple structure and lacks a structure for guiding lubricants, which will cause local accumulation of lubricants (especially grease) and poor lubrication. And frequent application of lubricants is needed. However, due to poor lubrication, surfaces of the bearing may suffer from pressure erosion, and even abnormal noise may occur.

Finally, another important aspect for the bearings used on CT machine is to reduce noise and vibration as much as possible, but the traditional cage design performs poorly in the terms of vibration and noise.

Therefore, a new design of cage is needed in the field of large bearings to solve the problems suffered by the prior art.

SUMMARY

In view of the problems and demands mentioned above, the present disclosure provides a new technical solution, which solves the above problems and brings other technical effects by adopting the following technical features.

The present disclosure provides a cage for a bearing, wherein the cage comprises a pocket (2), and a lubrication structure is provided on the pocket (2), and the lubrication structure comprises a lubricant storage groove and/or a lubricant guiding groove. This lubrication structure is especially suitable for the lubrication of large-size cages and large-size bearings.

The present disclosure also provides a bearing comprising the cage described before.

DETAILED DESCRIPTION

Figure 1:
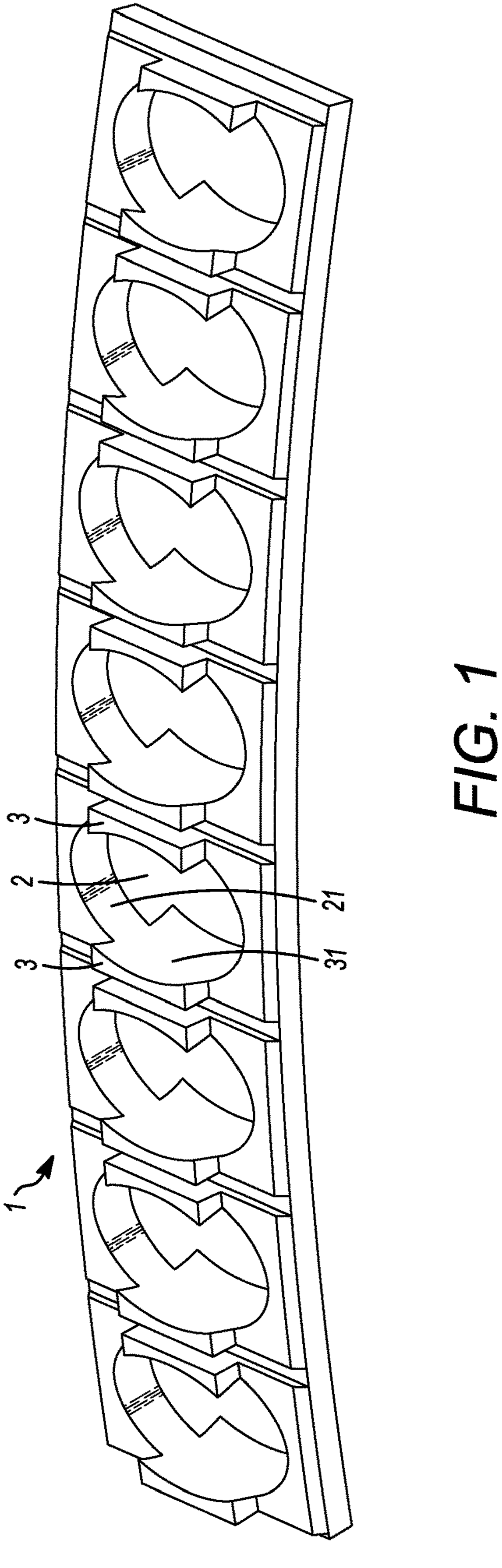
FIG. 1 is a perspective view of an arc-shaped segment for forming a segmented cage according to one embodiment of the present disclosure.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the art without creative labor fall into the scope of protection of the present disclosure.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the art to which this disclosure belongs. The terms “first”, “second” and similar terms used in the specification and claims of this disclosure do not indicate any order, quantity or importance, but are only used to distinguish different components. When the number of parts is not specified, the number of parts can be one or more; similarly, similar words such as “a/an”, “the” and “said” do not necessarily mean quantity limitation. For example, similar words such as “including” or “comprising” mean that the elements or objects appearing before the word cover the elements or objects listed after the word and their equivalents, without excluding other elements or objects. Similar terms such as “installation”, “setting”, “connection” or “coupling” are not limited to physical or mechanical installation, setting and connection, but may comprise electrical installation, setting and connection, whether directly or indirectly. "Up", "down", "left" and "right" are only used to indicate the relative orientation relationship when the equipment is used or the orientation relationship shown in the attached drawings. When the absolute position of the described object changes, the relative orientation relationship may also change accordingly.

For the convenience of explanation, the direction of the rotation axis of the bearing is called an axial direction, and the direction perpendicular to the axial direction is called a radial direction. The term "inner/inward" refers to the direction toward the inside of the bearing, whereas the term "outer/outward" refers to the direction toward the outside of the bearing. Moreover, the bearing usually comprises a plurality of rolling elements, and there is a plurality of pockets in the corresponding cage for holding the rolling elements. In addition, in different embodiments, the same reference numerals are used to refer to components having the same or similar structures and functions.

Figure 2:
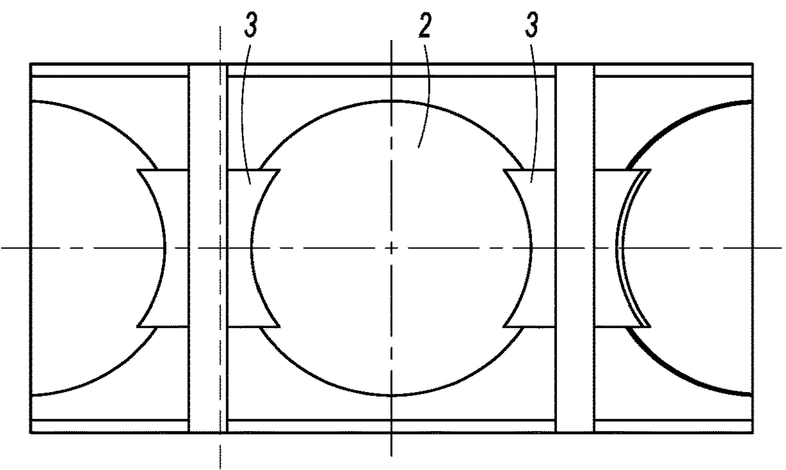
FIG. 2 is a partial plan view of an arc-shaped segment for forming the segmented cage according to one embodiment of the present disclosure.
Figure 3:
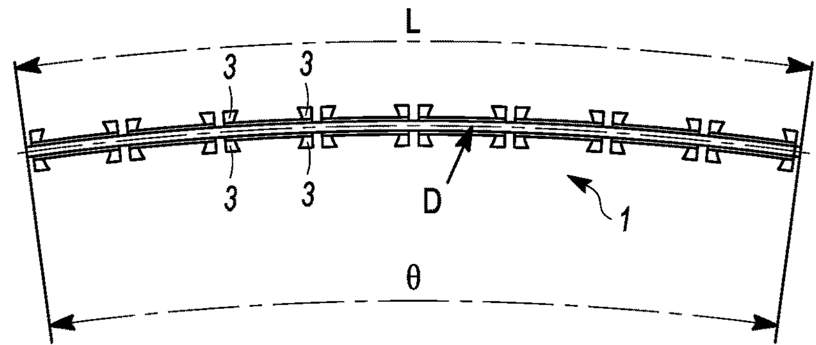
FIG. 3 is a schematic diagram of relevant dimensional parameters of an arc-shaped segment according to one embodiment of the present disclosure.

According to one embodiment of the present disclosure, the present disclosure provides an arc-shaped segment 1 for assembling a segmented bearing cage. FIGS. 1-3 show an arc-shaped segment 1, and a plurality of such arc-shaped segments 1 abut on or connect with each other after being assembled in a bearing, to form a complete cage (not shown). In this embodiment, the cage formed by the plurality of arc-shaped segments 1 can be used for a ball bearing, for example, and each arc-shaped segment 1 has a pocket 2 for holding a ball. Moreover, in order to hold a rolling element, the arc-shaped segment 1 also comprises claws 3 (described in detail later) near the pocket 2.

According to the present disclosure, an arc length L and a radian angle θ of the arc-shaped segment 1 satisfy the following relationship:

$$360L/\pi D-20^\circ\leq\theta\leq 360L/\pi D+30^\circ;$$

wherein, D is the diameter of the segmented bearing cage after assembled, and the arc length L refers to the arc length corresponding to the radian angle θ of the arc-shaped segment 1. It should be understood that this diameter corresponds to the diameter of the pitch circle of the assembled cage according to a common understanding in the art.

Further preferably, the arc length L and the radian angle θ of the arc-shaped segment 1 satisfy the following relationship:

$$360L/\pi D-15^\circ\leq\theta\leq 360L/\pi D+28^\circ.$$

Therefore, relevant structures and dimensions of the arc-shaped segment can be designed according to the diameter of the interested bearing and the actual needs. For example, the radian angle can be designed according to a required length of the arc-shaped segment, or the length of the arc-shaped segment can be designed according to a required radian angle. Moreover, since the cage formed by the arc-shaped segments is a ring with a large diameter and each arc-shaped segment has certain elasticity, an allowable range for the radian angle as mentioned above is set provided to accommodate the assembly of the cage more flexibly.

When assembling a bearing using the cage according to the present disclosure, one can only install the rolling elements into the pockets of the arc-shaped segments first, and then assembled the arc-shaped segments with the rolling elements into the raceway of the inner and outer rings of the bearing. Compared with the prior art, assembly of the rolling elements with the arc-shaped segments and assembly of the arc-shaped segments with the bearing can be very simple, which greatly improves the assembly efficiency of such large bearing and reduces the assembly difficulty.

Preferably, in the simplest situation, the adjacent arc-shaped segments in the bearing only need to be placed adjacent to each other, that is, the arc-shaped segments assembled with rolling elements only need to be placed into the bearing sequentially and abut against each other. According to other embodiments not shown, arc-shaped segments may be fixed by any means, such as by snapping, bonding, welding, etc., or the adjacent arc-shaped segments may be detachably connected with each other, such as by any suitable structure. For example, buckles, snaps, notches and the like (which are detachably engaged with each other) may be disposed at the circumferential ends of the arc-shaped segments.

It should also be understood that, although the embodiment shown in the drawings described the present disclosure by arc-shaped segments for segmented cages used for ball bearings, the principles of the present disclosure may be applied to bearings with other types of rolling elements.

In addition, preferably, the segmented bearing cage described before may be used for a large bearing with a cage diameter of 0.7 m≤D≤1.5 m, and the arc length L of the arc-shaped segment satisfies: $\pi D/15\leq L\leq\pi D/10$. Preferably, the number X of the arc-shaped segments may be 6≤X≤20.

Compared with a traditional cage with a diameter of 0.7 m or even more than 1 m, manufacture cost of each arc-shaped segment is low and it can be easily manufactured, and when some arc-shaped segment of the cage malfunctions, only the problematic arc-shaped segment needs to be replaced rather than replacing the whole cage, which further reduces the maintenance cost.

Preferably, the arc-shaped segment may be made of flexible materials, such as rubber, resin, polymer materials, such as nylon polymer (nylon+glass fiber), etc. Therefore, by using arc-shaped segments with same or similar lengths, cages with different diameters can be assembled so as to be applied to bearings with different diameters.

Specifically, a cage for a bearing to be used is usually designed according to the needs of the bearing, and then the number of arc-shaped segments and the arc lengths thereof are determined accordingly. At the same time, due to the characteristics of flexible materials, the radian angle of the arc-shaped segment may fall in a certain allowable range (as mentioned above) to accommodate the assembly of the cage more flexibly.

As mentioned above, an arc-shaped segment 1 may comprise a pocket 2 for a rolling element, and the pocket 2 itself has a shape to accommodate the bearing rolling element. As in the present disclosure as shown in the figures, the pocket 2 is designed to completely enclose the corresponding ball, and the cage composed of a plurality of arc-shaped segments is a window-type cage.

In the prior art, there is a kind of cage with semi-enclosed pockets. In this semi-enclosed pocket design, each pocket may be formed with an opening on one axial side and claws arranged adjacent to the opening, so that the cage can be only assembled after balls are placed between inner and outer rings of a bearing, that is, the openings of the pockets of the cage must be aligned with the corresponding balls first, and then the balls can push-open the claws and then be pressed into the pockets. However, this kind of pockets with openings may deform undesirably during bearing operation, resulting in problems such as balls falling off and cage cracking. In the cage of the present disclosure, the pockets can be designed with a fully enclosed structure, that is, on the cylindrical surface where the pitch circle of the cage is located, each pocket completely encloses the corresponding ball, and since the opening is removed, loading condition of the cage can be significantly optimized, and the problems like cracking, ball falling-off etc. caused by cage deformation in the prior art can be avoided. Moreover, according to a more optimized pocket design described later, better effects can be achieved in comparison with other window-type cages in the prior art.

Figure 7:
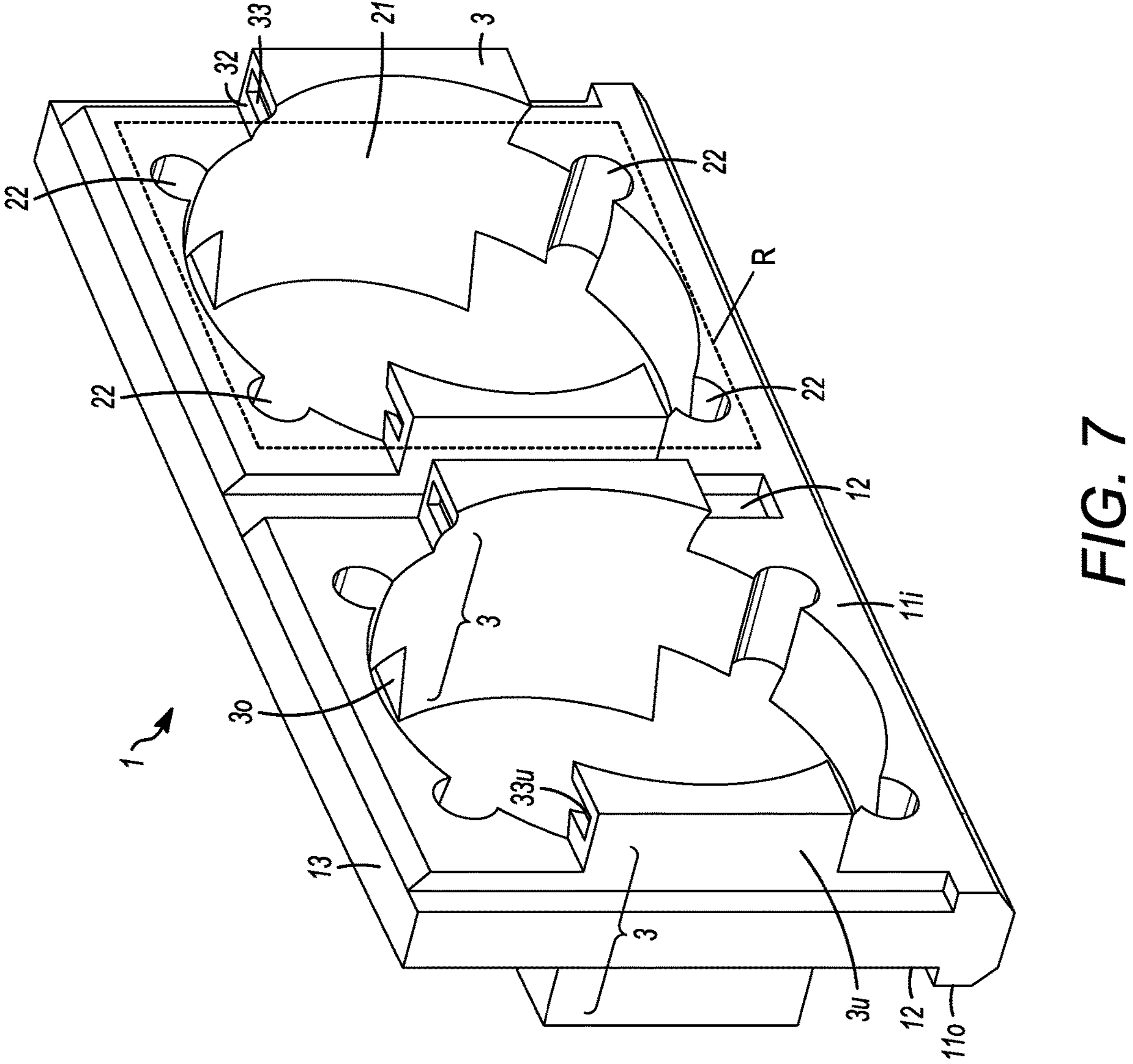
FIG. 7 is a schematic diagram of a cage lubrication structure according to one embodiment of the present disclosure.

Further preferably, the arc-shaped segment 1 comprises claws 3 extending from the side wall 21 of the pockets 2 toward a radially inner side and a radially outer side of the arc-shaped segment 1, and forms a pair of claws 3 which opposes to each other along the circumferential direction (particularly shown in FIGS. 3 and 7). Of course, it should be understood that, although it is shown in the embodiment of the figures that the claws 3 are formed on both the radially inner side and the radially outer side of the arc-shaped segment 1, in an embodiment not shown, there may be claws only extending from the side wall 21 of the pocket 2 toward the radially inner side of the arc-shaped segment, or there may be claws only extending from the side wall 21 of the pocket 2 toward the radially outer side of the arc-shaped segment.

Preferably, the present disclosure also provides a further improvement of the claws 3 as shown in the figures. For example, a gap may be provided between adjacent claws of adjacent pockets, so that when rolling elements are assembled into the pockets, the claws can be deformed more easily, so as to press the rolling elements into the pockets.

Further preferably, referring to FIG. 1, both the inner side face 31 of the claw 3 and the side wall 21 of the pocket 2 are part of the ellipsoidal shape of the pocket 2.

According to another aspect of the present disclosure, the present disclosure also provides a pocket structure design. Compared with spherical pockets in the prior art cage, according to one embodiment of the present disclosure, the pocket 2 of the arc-shaped segment 1 is designed with a roughly ellipsoidal shape. Through this configuration, there may be a smaller circumferential clearance or a smaller axial clearance between the rolling element and the pocket, so as to improve the vibration of the whole bearing according to different load requirements.

Figure 4:
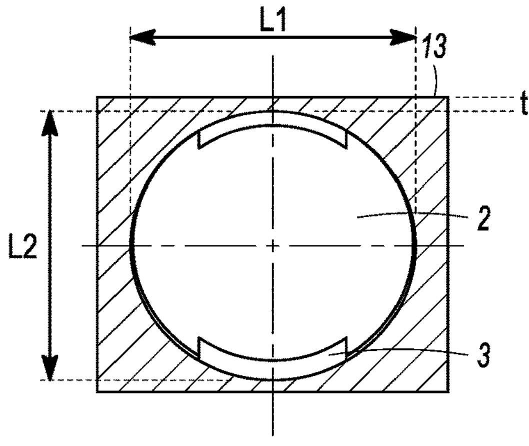
FIG. 4 is a schematic diagram of relevant dimensional parameters of the cage pocket structure according to one embodiment of the present disclosure.

Further preferably, referring to FIG. 4, it shows a cross-sectional view of one pocket 2 of the arc-shaped segment 1 taken along the pitch circle of the cage. As shown in the figure, the pocket 2 has an ellipsoid shape, and has a major axis L1 and a minor axis L2. The major axis L1 is arranged along the axial direction, and the minor axis L2 is arranged along the circumferential direction, so that a smaller circumferential clearance is formed between the rolling element and the pocket.

Preferably, as shown in FIG. 4, the shortest distance t between the side wall 21 of the pocket 2 and the axial end face 13 of the cage is 0.5 mm or more. Therefore, it can be ensured that the cage has sufficient thickness at this portion to ensure sufficient strength.

Figure 5A:
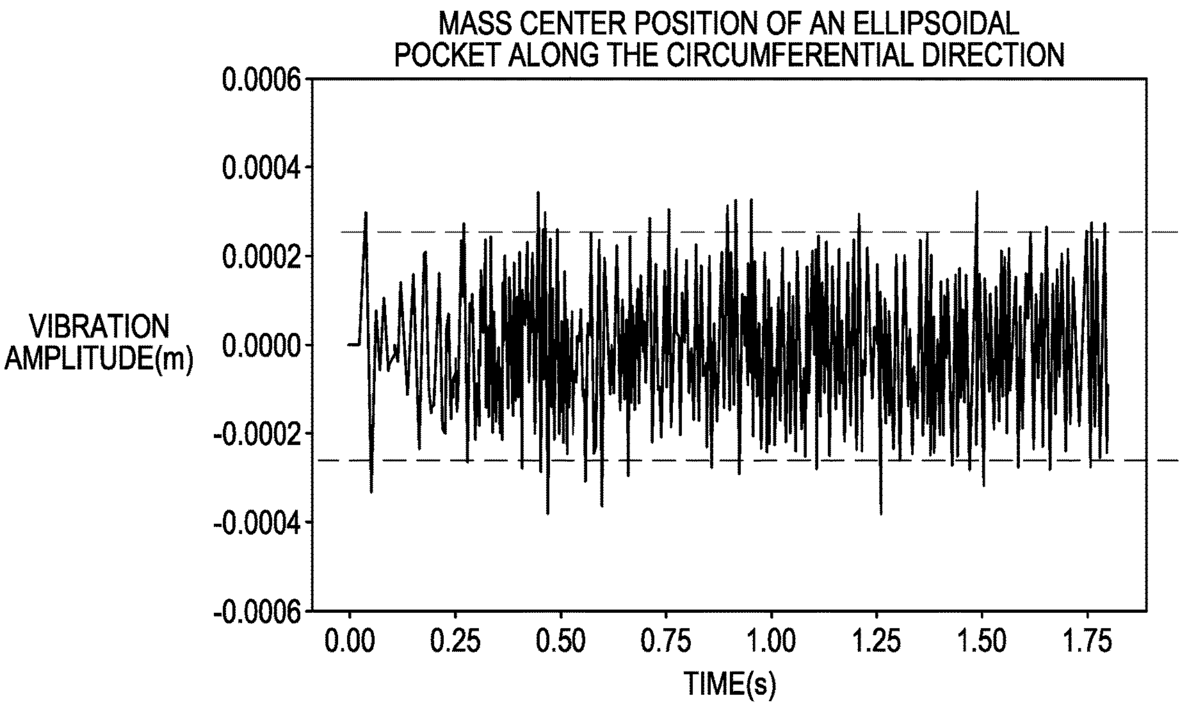
FIGS. 5-6 show comparisons between the vibration amplitude of mass center positions of an ellipsoidal pocket according to one embodiment of the present disclosure and the vibration amplitude of mass center positions of a spherical pocket of the prior art.
Figure 5B:
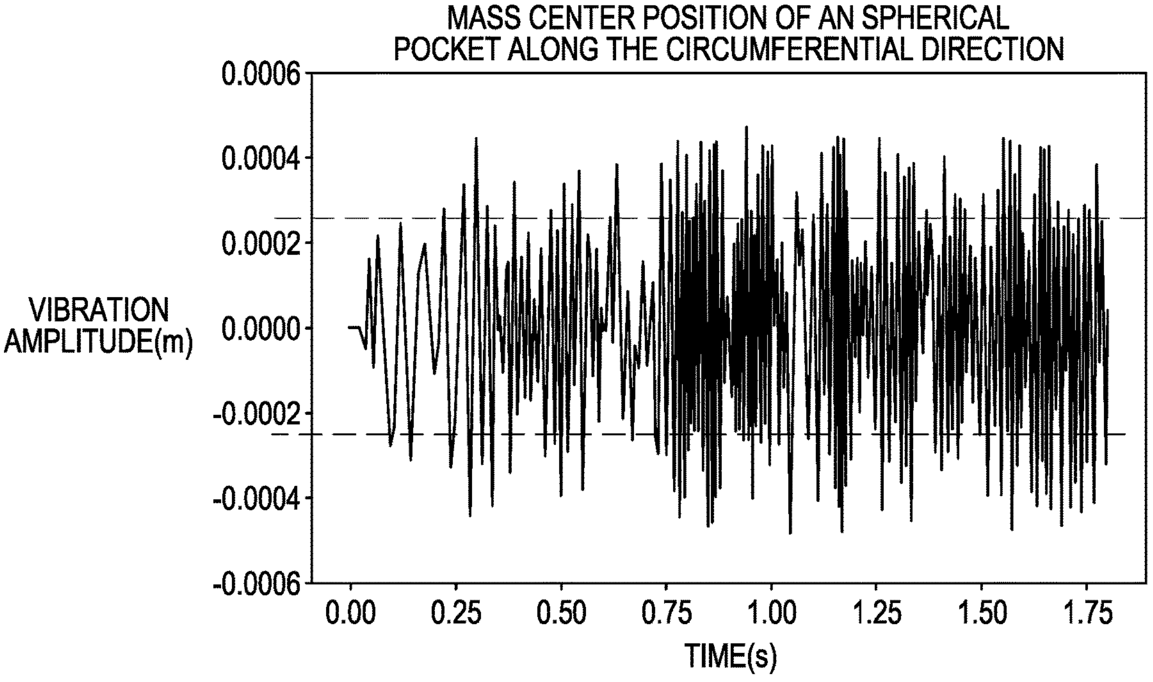
Figure 6A:
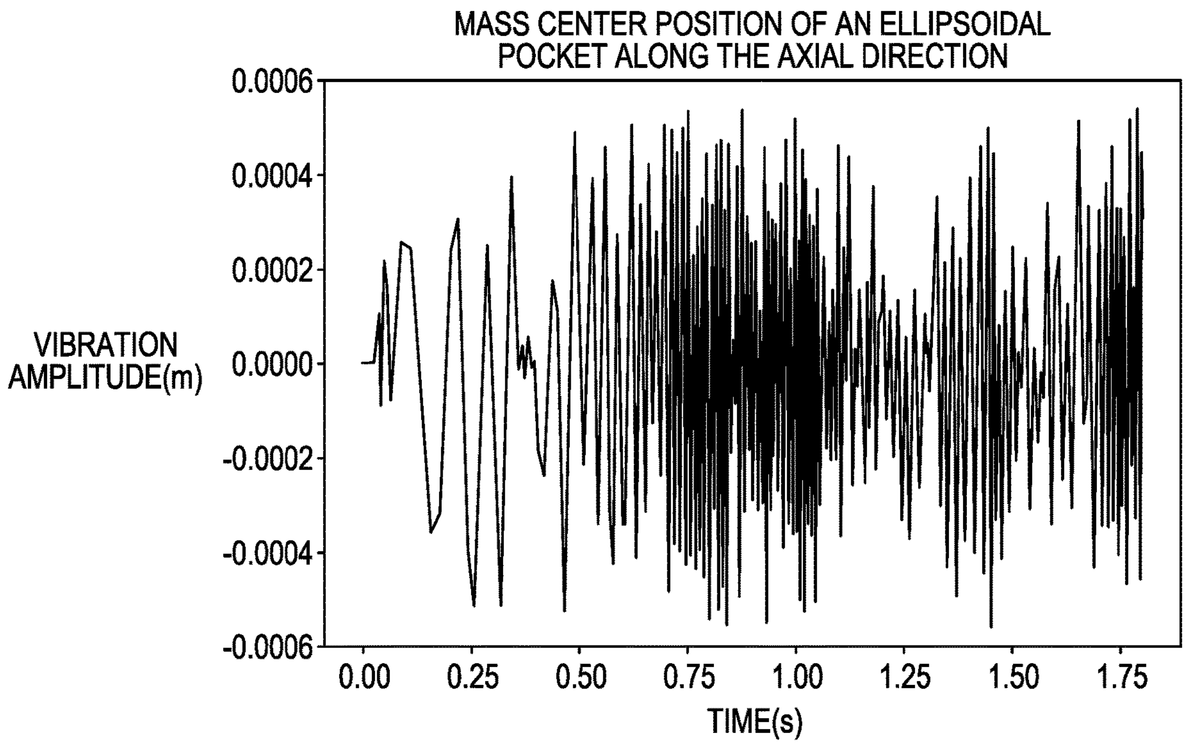
Figure 6B:
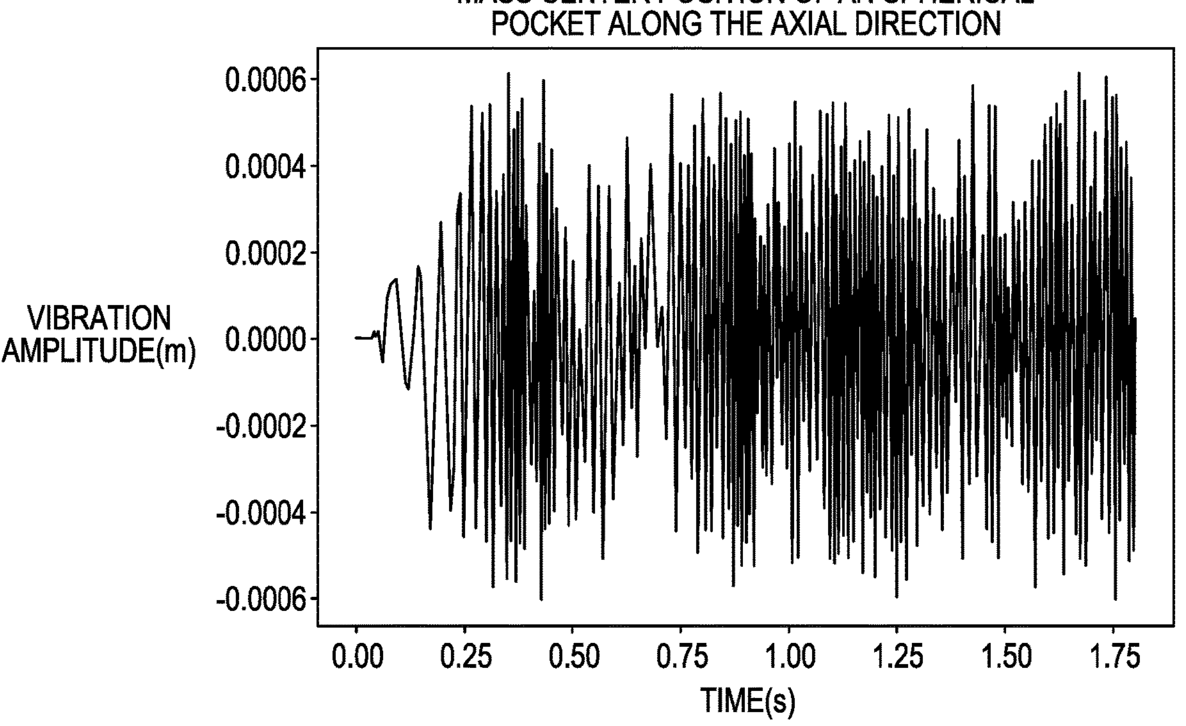

FIGS. 5 and 6 show simulation results of the vibration of mass center positions of two cages along different directions, with one cage including the ellipsoidal pockets shown in FIG. 4 and the other cage including the spherical pockets of the prior art, wherein the ellipsoidal pocket has a major axis L1 and a minor axis L2 set as described above, and the spherical pocket has a diameter L1 equal to the major axis of the ellipsoidal pocket.

Referring to the vibration simulation results along the circumferential direction in FIG. 5, since the minor axis L2 of the ellipsoidal pocket is smaller than the diameter L1 of the spherical pocket, a smaller circumferential clearance is realized, so that, along the circumferential direction, the vibration amplitude of the mass center position of the assembled cage with ellipsoidal pockets is smaller than that of the cage with spherical pockets of the prior art. As shown by the dotted line in FIG. 5, the average maximum vibration amplitude of the mass center position of the cage with ellipsoidal pockets is significantly smaller than that of the cage with spherical pockets. This improvement is especially suitable for the case in which the bearing bears a large force along the radial direction.

Referring to the vibration simulation results along the axial direction in FIG. 6, since the ellipsoidal pocket and the spherical pocket have the same axial dimension L1, they have the same axial clearance, and it can be seen that the central mass positions of the cage with ellipsoidal pockets and the cage with spherical pockets also have substantially the same vibration amplitude. It can be seen that the vibration of mass center position along the circumferential direction is significantly improved by adopting the ellipsoid pocket design, and there is no obvious adverse effect on the vibration of mass center position along the axial direction.

According to a not-shown preferred embodiment of the present disclosure, positions of the major axis and the minor axis of the ellipsoidal pocket may be adjusted, that is, the major axis may be arranged along the circumferential direction and the minor axis may be arranged along the axial direction. Furthermore, the axial clearance may be larger under when large force is applied along the axial direction, so as to improve the vibration amplitude of mass center position of the cage along the axial direction.

Further preferably, in any of the above cases, the major axis L1 and the minor axis L2 may satisfy: L2<L1≤1.07L2. Taking the shortest distance t and the vibration of mass center as mentioned above into account, the major axis L1 and the minor axis L2 falling into the above range can not only ensure the pocket with sufficient strength, but also ensure a better optimization for the vibration of mass center. If the value of L1 exceeds this range, it means that the pocket has a larger ovality, which may lead to a thinner sidewall of the pocket and a larger clearance between the rolling element and the pocket, which is unfavorable for the stable operation of the rolling element.

More preferably, the major axis L1 and the minor axis L2 may satisfy:

$$L2 < L1 \leq 1.05L2.$$

According to another aspect of the present disclosure, a design for lubrication structure is also provided, that is, a lubrication structure is provided on each pocket 2, and the lubrication structure comprises a lubricant storage groove and/or a lubricant guiding groove. This lubrication structure is especially suitable for the lubrication of large-size cages and large-size bearings.

With particular reference to FIG. 7, and as previously mentioned, the arc-shaped segment 1 may comprise claws 3 extending from the side wall 21 thereof. Preferably, the axial end faces 32 of the claws 3 may comprise lubricant guiding grooves 33. When lubricant flows to the cage, the lubricant guiding grooves 33 can guide lubricant to the rotating rolling element, to lubricate the rolling element.

In the preferred embodiment shown in the drawings, the arc-shaped segment 1 comprises a pair of claws 3 (see the claws 3 marked by brackets on the left-hand pocket in FIGS. 3 and 7), which extend from the side wall 21 of each pocket 2 toward the radially inner side and the radially outer side of the arc-shaped segment 1 and oppose to each other along the circumferential direction. Lubricant guiding grooves 33 may be provided on the axial end faces 32 of each claw 3.

Specifically, the claw 3*u* on the radially inner side may comprise a first lubricant guiding groove 33*u*, and the claw 30 on the radially outer side may comprise a second lubricant guiding groove (not shown).

According to another preferred embodiment, the side wall 21 of the pocket 2 may comprise a lubricant storage groove 22, which may be arranged at a position corresponding to a corner of the circumscribed rectangle R of the pocket. In the preferred embodiment shown in the figures, the pocket 2 may comprise four lubricant storage grooves 22 arranged in the side wall 21 of the pocket 2 at the positions corresponding to the corners of the circumscribed rectangle R of the pocket. Through the lubricant storage grooves 22 arranged in the pocket 2, when lubricant supply is sufficient, lubricant can be stored in the grooves 22, and when lubricant supply is insufficient, lubricant in the grooves 22 can be released to provide continuous lubrication for the rolling element.

According to one variant not shown, each pocket 2 may comprise only two lubricant storage grooves at positions corresponding to the diagonal corners of the circumscribed rectangle R of the pocket, so as to simplify the structure of the pocket.

It should be understood that a lubricant storage groove may be in form of any suitable groove or hole with an opening. Preferably, the lubricant storage groove 22 may be provided as a cylindrical hole extending along the radial direction. When designing this kind of groove or hole, one can consider to make the intersecting edges, between the groove or hole and the side wall of the pocket, smoother, to avoid wear or damage of the edges.

Preferably, for the ellipsoidal pocket with major and minor axes, distance from the bottom of the lubricant storage groove 22 to the ellipsoidal surface of the pocket 2 is 1/10 to 1/15 of the major axis of the pocket 2, so as to ensure the pocket with sufficient strength and ensure the lubricant storage groove with sufficient lubricant stored therein. Further preferably, the opening width of the lubricant storage groove 22 facing the pocket 2 is 1/4 to 1/2 of said distance.

According to the preferred embodiment of the present disclosure, lubricant storage grooves 12 may be provided on the outer circumferential surface 110 and the inner circumferential surface 11*i* of the arc-shaped segment between adjacent pockets 2, and the lubricant storage grooves 12 extend along the axial direction. Further preferably, the lubricant storage grooves 12 may be set with one end open and the other end closed along the axial direction, so that when lubricant supply is sufficient, lubricant can be stored in the grooves, and when lubricant supply is insufficient, lubricant in the grooves can be released, for example, into the lubricant guiding grooves 33 on the claws 3, to provide continuous lubrication for the rolling element.

It should be understood that although the pocket structure and the lubrication structure on the arc-shaped segment 1 are described above by referring to the arc-shaped segment, it should be understood that the pocket structure and the lubrication structure may be applied to non-segmented cages, as long as such cages comprise pockets and are applied with the pocket structure or the lubrication structure according to the present disclosure, and they all fall within the protection scope of the present disclosure.

The present disclosure also provides a bearing comprising the segmented cage as described above, and the bearing may be used for a rotating shaft of a large equipment such as CT machine. Therefore, for such a large equipment, the segmented cage according to the present disclosure not only provides convenience for assembly and replacement, but also has low cost and excellent performance.

Exemplary embodiments of the present disclosure have been described in detail above with reference to preferred embodiments. However, those skilled in the art can understand that various variations and modifications can be made to the above specific embodiments without departing from the concept of the present disclosure, and various technical features and structures provided in the present disclosure can be combined in various ways without exceeding the protection scope of the present disclosure, which is determined by the appended claims.

What is claimed is:

1. A cage for a bearing comprising:

a first pocket configured to hold a first rolling element of the bearing;

a second pocket next to the first pocket and configured to hold a second rolling element of the bearing;

a lubrication structure provided on the first pocket, the lubrication structure comprising a first lubricant storage groove and a first lubricant guiding groove;

an outer circumferential surface;

an inner circumferential surface; and a second lubricant storage groove extending in an axial direction, the second lubricant storage groove provided on the outer circumferential surface of the cage or the inner circumferential surface of the cage between the first and second pockets, the second lubricant storage groove extending over more than half an axial width of the cage, the axial width extending in the axial direction;

wherein the first pocket includes a side wall and a first claw extending from the side wall toward a radially inner side or a radially outer side of the cage for holding the first rolling element of the bearing after the first rolling element is assembled in the first pocket, the first claw of the first pocket having an axial end face, the first lubricant guiding groove being provided on the axial end face of the first claw of the first pocket.

2. The cage according to claim 1, wherein the first claw extends from the side wall toward the radially inner side of the cage, wherein the first pocket includes a second claw extending from the side wall toward the radially outer side of the cage, the lubrication structure comprising a second lubricant guiding grove, the second lubricant guiding groove being provided on the second claw of the first pocket.

3. The cage according to claim 1, wherein the lubrication structure comprises the first lubricant storage groove, the first pocket includes a side wall, the side wall including the first lubricant storage groove, and the first lubricant storage groove being disposed at a position corresponding to a corner of a circumscribed rectangle of the first pocket.

4. The cage according to claim 3, wherein the side wall of the first pocket includes exactly two or four lubricant storage grooves, said two or four lubricant storage grooves including the first lubricant storage groove.

5. The cage according to claim 1, wherein the lubrication structure comprises the first lubricant storage groove, the first pocket includes a side wall, the side wall including the first lubricant storage groove, wherein the first pocket is an ellipsoidal pocket and comprises a major axis and a minor axis, wherein a distance from a bottom of the first lubricant storage groove to an ellipsoidal surface of the pocket is 1/10 to 1/15 of the major axis of the first pocket.

6. The cage according to claim 5, wherein the first lubricant storage groove is a cylindrical hole extending along a radial direction.

7. The cage according to claim 1, wherein the second lubricant storage groove is provided on the outer circumferential surface of the cage, the cage further comprising a third lubricant storage groove provided on the inner circumferential surface of the cage between the first and second pockets.

8. The cage according claim 7, wherein the third lubricant storage groove extends in an axial direction, the third lubricant storage groove extending over more than half the axial width of the cage.

9. The cage according to claim 8, wherein the second and third lubricant storage grooves each extend over the entire axial width of the cage.

10. The cage according to claim 7, wherein the third lubricant storage groove has one end open and an opposite end closed along the axial direction.

11. The cage according to claim 1, wherein the second lubricant storage groove has one end open and an opposite end closed along the axial direction.

12. The cage according to claim 1, wherein the cage is a segmented cage comprising a plurality of arc-shaped segments, each arc-shaped segment comprising a plurality of pockets, the plurality of pockets of one of the arc-shaped segments including the first and second pockets, the arc-shaped segments being configured to abut one another or connect with one another to completely form the cage.

13. A bearing comprising the cage according to claim 1.

14. The cage according to claim 1, wherein the second lubricant storage groove extends over the entire axial width of the cage.

15. The cage according to claim 1, wherein the second lubricant storage groove has one end open and an opposite end open along the axial direction.

16. The cage according to claim 1, wherein the first pocket includes a second claw, the first and second claws both extending from the side wall toward the radially inner side or the radially outer side of the cage, the first and second claws opposing one another along a circumferential direction, the lubrication structure comprising a second lubricant guiding groove, the second lubricant guiding groove being provided on the second claw of the first pocket.

17. The cage according to claim 1, wherein the lubrication structure comprises the first lubricant storage groove, the first pocket includes a side wall having exactly two lubricant storage grooves, said two lubricant storage grooves including the first lubricant storage groove.

18. The cage according to claim 1, wherein the second lubricant storage groove is provided on the inner circumferential surface of the cage.

19. The cage according to claim 1, wherein the cage is a segmented cage comprising a plurality of arc-shaped segments, each arc-shaped segment comprising a plurality of pockets, the plurality of pockets of one of the arc-shaped segments including the first and second pockets, the arc-shaped segments being configured to abut one another to completely form the cage.

20. The cage according to claim 1, wherein the first lubricant guiding groove has a first end open and an opposite second end closed along the circumferential direction, the first end being arranged relative to the second end so that the first end is closer to the first rolling element after the first rolling element is assembled in the first pocket than the second end.

* * * * *